US008723902B2

(12) United States Patent
Takahashi (10) Patent No.: US 8,723,902 B2
(45) Date of Patent: May 13, 2014

(54) POLYGON MOTOR UNIT, AND OPTICAL SCANNING DEVICE AND IMAGE FORMING APPARATUS WITH SAME (71) Applicant: KYOCERA Document Solutions Inc., Osaka (JP)

(72) Inventor: Hiroki Takahashi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/680,336

(22) Filed: Nov. 19, 2012

(65) Prior Publication Data

US 2013/0135421 A1 May 30, 2013

(30) Foreign Application Priority Data

Nov. 28, 2011 (JP) ................................. 2011-259154

(51) Int. Cl.
*B41J 2/385* (2006.01)
*B41J 2/41* (2006.01)
*B41J 2/435* (2006.01)

(52) U.S. Cl.
USPC ............................ 347/138; 347/152; 347/263

(58) Field of Classification Search
USPC ......... 347/111, 112, 129, 138, 152, 224, 225, 347/263
See application file for complete search history.

(56) References Cited

U.S. PATENT DOCUMENTS

2001/0001251 A1* 5/2001 Tachibe et al. ................ 359/819
2006/0082639 A1* 4/2006 Kojima ......................... 347/224

FOREIGN PATENT DOCUMENTS

| JP | 06-075184 | 3/1994 |
| JP | 2003-127457 | 5/2003 |
| JP | 2005-215284 | 8/2005 |
| JP | 2011-150005 | 8/2011 |

* cited by examiner

*Primary Examiner* — Alessandro Amari
*Assistant Examiner* — Kendrick Liu
(74) *Attorney, Agent, or Firm* — Gerald E. Hespos; Michael J. Porco; Matthew T. Hespos (57) ABSTRACT A polygon motor unit is mounted in a housing and includes a polygon mirror, a polygon motor, a board, a thermally conductive member and an elastic member. The polygon mirror is rotated and deflects light. The polygon motor includes a shaft portion and rotates the polygon mirror. The board includes a first surface and a second surface opposite to the first surface, and the polygon mirror and the polygon motor are mounted on the first surface. The thermally conductive member includes a positioning portion for setting a reference position, a third surface facing the second surface and a projection projecting from the third surface toward the second surface and configured to position the board with respect to the reference position by coming into contact with the second surface. The elastic member is made of a thermally conductive material and arranged between the second surface and the third surface.

17 Claims, 7 Drawing Sheets

POLYGON MOTOR UNIT, AND OPTICAL SCANNING DEVICE AND IMAGE FORMING APPARATUS WITH SAME

This application is based on Japanese Patent Application Serial No. 2011-259154 filed with the Japan Patent Office on Nov. 28, 2011, the contents of which are hereby incorporated by reference.

BACKGROUND

The present disclosure relates to a polygon motor unit with a polygon motor and an optical scanning device and an image forming apparatus with such a polygon motor unit.

An exposure unit described below has been conventionally known as a unit with a polygon motor. In this technology, the exposure unit includes a housing which is provided with a bottom portion and a lid portion, a polygon mirror which is driven and rotated and deflects light irradiated to the circumferential surface thereof to scan a predetermined target, a polygon motor which rotates the polygon mirror, a drive circuit board and a heat pipe. The polygon mirror and the polygon motor are supported on the drive circuit board and the drive circuit board is fixed to the bottom portion of the housing. Further, a heat diffusion member is arranged on the lid portion of the housing and the heat pipe is connected between the drive circuit board and the heat diffusion member. Heat generated as the polygon motor rotates is transferred from the drive circuit board to the heat diffusion member located above along the heat pipe.

In the case of transferring the heat generated on the drive circuit board upward by the heat pipe as in the above technology, a space occupied by the exposure unit increases since a space above the polygon mirror is occupied. On the other hand, in the case of radiating heat utilizing a housing bottom side of the drive circuit board, the heat is thought to be transferred via a supporting portion by which the drive circuit board is supported on the housing bottom portion. In this case, it is desired to increase the surface area of the supporting portion to promote heat radiation. However, since the drive circuit board includes the polygon mirror, the supporting portion that also functions to position the polygon mirror is required to have high positioning accuracy. Thus, an increase of the surface area of the supporting portion leads to an increase of an area required to be processed with high accuracy, which brings about a cost increase of the exposure unit.

The present disclosure was developed in view of the above problem and an object thereof is to efficiently radiate heat from a board supporting a polygon mirror and a polygon motor for rotating the polygon mirror.

SUMMARY

A polygon motor unit according to one aspect of the present disclosure is mounted in a housing and includes a polygon mirror, a polygon motor, a board, a thermally conductive member and an elastic member. The polygon mirror is driven and rotated and deflects light irradiated to the circumferential surface thereof to scan a predetermined target. The polygon motor includes a shaft portion and rotates the polygon mirror. The board includes a first surface and a second surface opposite to the first surface, and the polygon mirror and the polygon motor are mounted on the first surface. The thermally conductive member includes a positioning portion for setting a reference position with respect to the housing, a third surface facing the second surface and a projection projecting from the third surface toward the second surface and configured to position the board with respect to the reference position by coming into contact with the second surface. The elastic member is made of a thermally conductive material and arranged between the second surface and the third surface and comes into contact with the second surface and the third surface with a restoring force.

Further, an optical scanning device according to another aspect of the present disclosure includes a housing, the polygon motor unit with the polygon mirror, and a light source. The light source irradiates light to the polygon mirror.

Furthermore, an image forming apparatus according to still another aspect of the present disclosure includes the housing, the polygon motor unit with the polygon mirror, the light source and an image bearing member. The image bearing member is scanned by the polygon mirror to form an electrostatic latent image on a surface.

These and other objects, features and advantages of the present disclosure will become more apparent upon reading the following detailed description along with the accompanying drawings.

DETAILED DESCRIPTION

Figure 1:
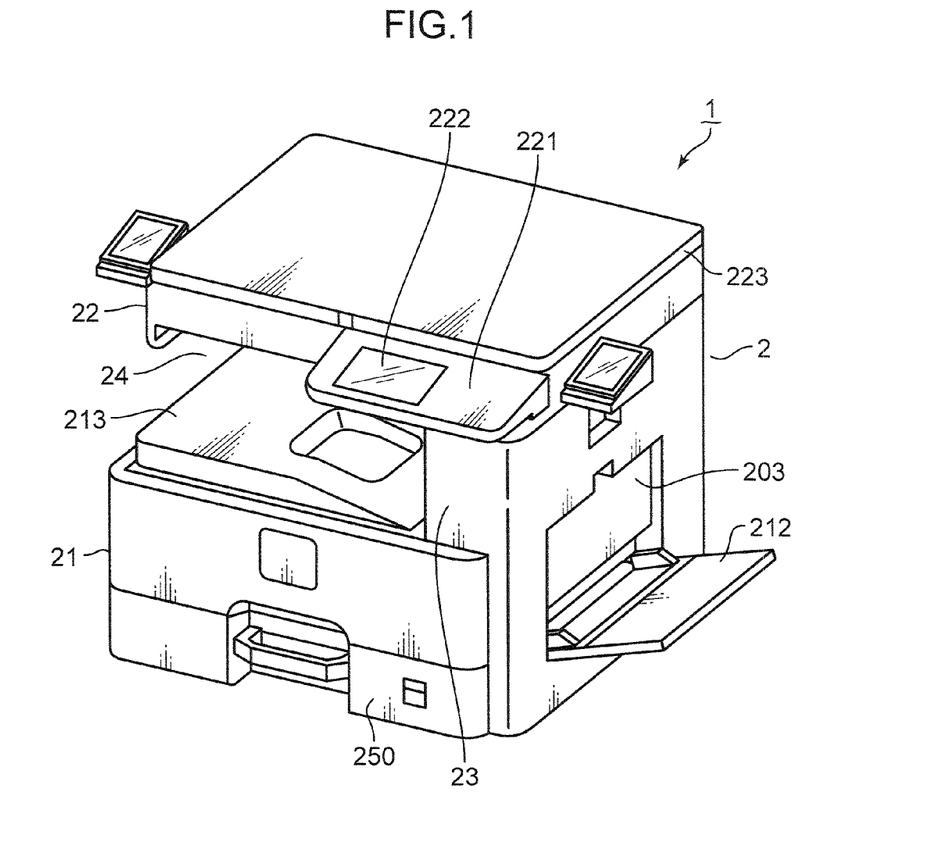
FIG. 1 is a perspective view of an image forming apparatus according to an embodiment of the present disclosure.

Hereinafter, one embodiment of the present disclosure is described with reference to the drawings. An image forming apparatus 1 includes a substantially rectangular parallelepipedic main housing 2. The main housing 2 includes a lower housing 21, an upper housing 22 arranged above the lower housing 21 and a connecting housing 23 connecting the lower housing 21 and the upper housing 22. A sheet to which a printing process has been applied is discharged to a discharge space 24 enclosed by the lower housing 21, the upper housing 22 and the connecting housing 23.

An operation unit 221 projecting forward of the upper housing 22 includes, for example, an LCD touch panel 222. A document cover 223 arranged on the upper housing 22 is used to press a document.

A sheet tray 250 in which a plurality of sheets are stacked is arranged in the lower housing 21. Further, a sheet on a tray 212 is subjected to an image forming process after being pulled into the lower housing 21 and is discharged to the discharge space 24 based on an instruction input by a user through the operation unit 221. When being rotated upward, the tray 212 is housed into a housing space 203 formed by recessing the right surface of the lower housing 21, thereby closing a feed opening through which a sheet is pulled into the lower housing 21.

The connecting housing 23 houses various devices for discharging a sheet, to which the image forming process has been applied, to the discharge space 24.

Figure 2:
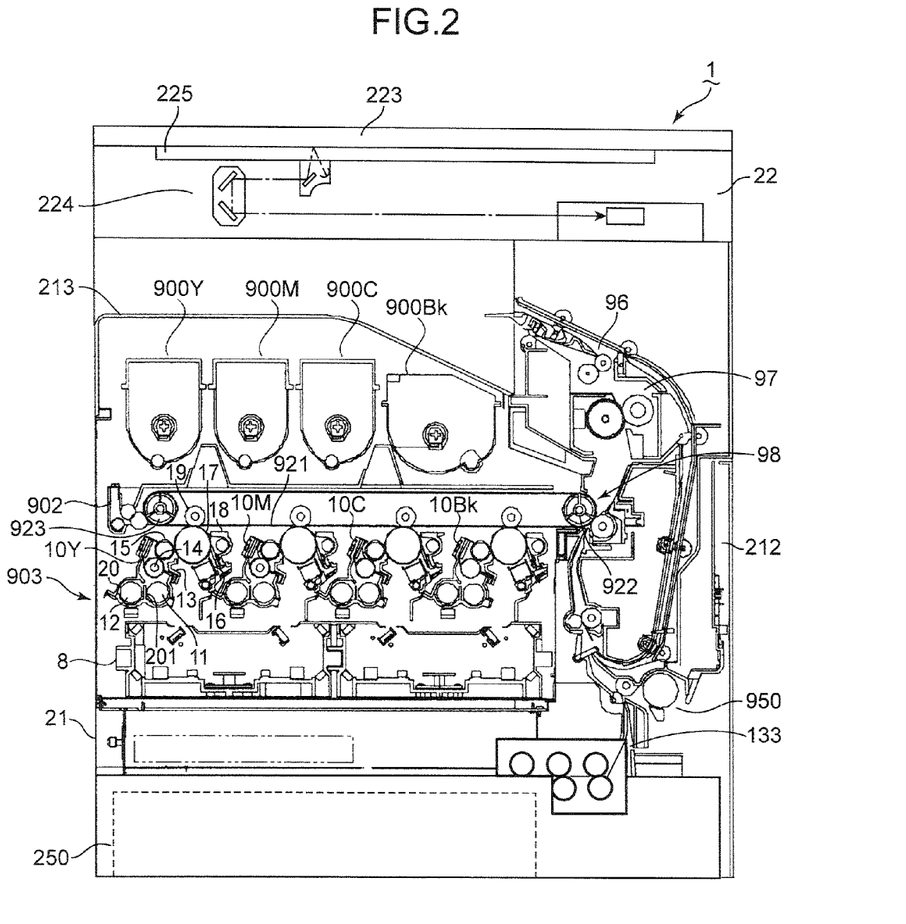
FIG. 2 is a sectional view of the interior of the image forming apparatus according to the embodiment of the present disclosure.

FIG. 2 schematically shows the internal configuration of the image forming apparatus 1 shown in FIG. 1. The upper housing 22 houses a scanning mechanism 224. A contact glass 225 to be mounted at the upper surface of the upper housing 22 is arranged above the scanning mechanism 224. When the user activates the image forming apparatus 1 through the operation unit 221, the scanning mechanism 224 scans and reads an image of a document on the contact glass 225.

Toner containers 900Y, 900M, 900C and 900Bk, an intermediate transfer unit 902, an image forming unit 903, an exposure unit 8, a fixing unit 97, a discharge unit 96 and a conveying unit 3 are housed in the lower housing 21.

The image forming unit 903 includes a yellow toner container 900Y, a magenta toner container 900M, a cyan toner container 900C and a black toner container 900Bk. Developing devices 10Y, 10M, 10C and 10Bk corresponding to respective colors of YMCBk are respectively arranged below these containers.

The image forming unit 903 includes photoconductive drums 17 for bearing toner images of the respective colors. Yellow, magenta, cyan and black toners are supplied from the respective developing devices 10Y, 10M, 10C and 10Bk to the corresponding photoconductive drums 17.

A charger 16, the developing device 10 (10Y, 10M, 10C, 10Bk), a transfer roller 19 and a cleaning device 18 are arranged around each photoconductive drum 17. The charger 16 uniformly charges a surface of the photoconductive drum 17. The charged surface of the photoconductive drum 17 is exposed to light by the exposure unit 8, whereby an electrostatic latent image is formed thereon. The developing devices 10Y, 10M, 10C and 10Bk develop (visualize) electrostatic latent images formed on the corresponding photoconductive drums 17 using the toners of the respective colors supplied from the toner containers 900Y, 900M, 900C and 900Bk. The transfer roller 19 forms a nip portion in cooperation with the photoconductive drum 17 with an intermediate transfer belt 921 held therebetween, and primarily transfers a toner image on the photoconductive drum 17 to the intermediate transfer belt 921. The cleaning device 18 cleans the circumferential surface of the photoconductive drum 17 after the transfer of the toner image.

Each of the developing devices 10Y, 10M, 10C and 10Bk includes a development housing 20. Further, two agitating rollers 11, 12 are rotatably arranged in parallel near a bottom portion of the development housing 20 in the development housing 20 with axial directions thereof aligned with a longitudinal direction.

A two-component developer in the development housing 20 forms a magnetic brush (not shown) on a magnetic roller 14. The layer thickness of the magnetic brush is restricted by a doctor blade 13, and the magnetic brush supplies the toner to a developing roller 15 located above. A toner layer on the developing roller 15 is formed by a potential difference between the magnetic roller 14 and the developing roller 15. An electrostatic latent image on the photoconductive drum 17 is developed by the toner layer.

The exposure unit 8 irradiates light based on image data to the circumferential surface of each photoconductive drum 17 provided in the image forming unit 903 to form an electrostatic latent image.

The intermediate transfer unit 902 includes the intermediate transfer belt 921, a drive roller 922 and a driven roller 923. Toner images are transferred from a plurality of photoconductive drums 17 onto the intermediate transfer belt 921 in a superimposition manner (primary transfer). The superimposed toner images are secondarily transferred to a sheet supplied from the sheet tray 250 or the tray 212 (see FIG. 1) at a secondary transfer unit 98. The drive roller 922 and the driven roller 923 for driving and turning the intermediate transfer belt 921 are rotatably supported on the lower housing 21.

The fixing unit 97 applies a fixing process to a toner image on a sheet. The sheet is discharged onto an upper surface 213 of the lower housing 21 via a discharge unit 96 formed above (in the connecting housing 23) the fixing unit 97.

Figure 3:
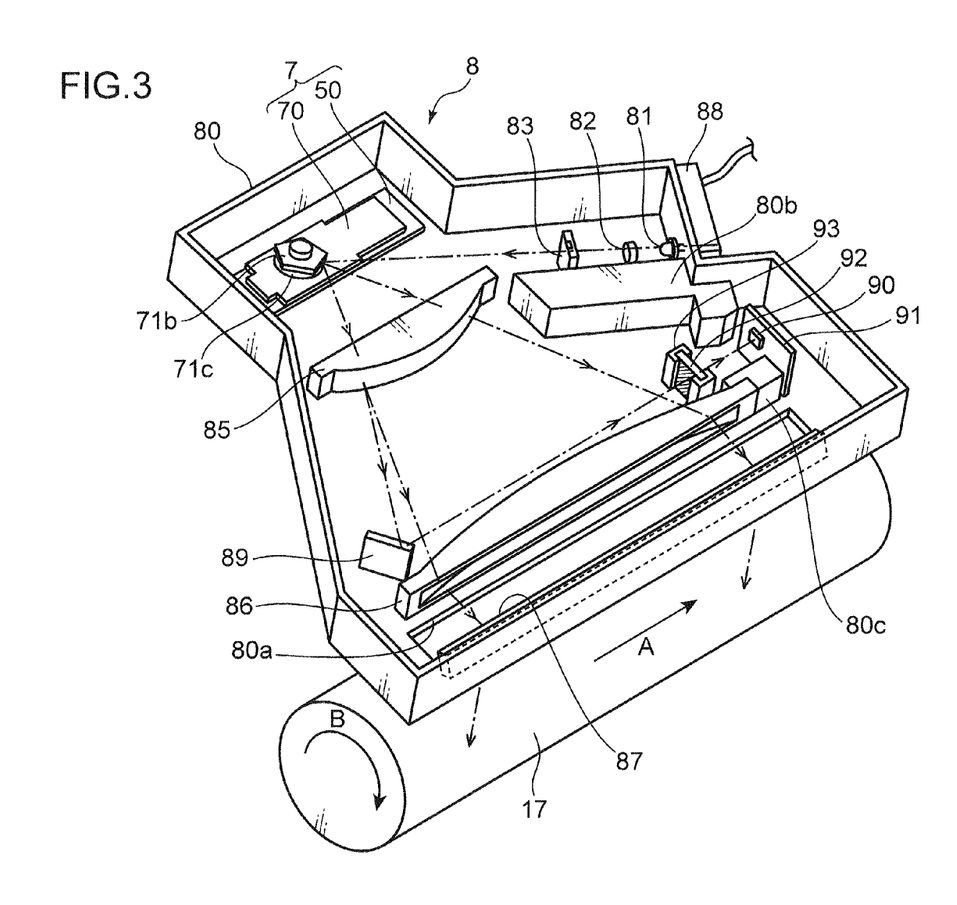
FIG. 3 is a perspective view of an exposure unit according to the embodiment of the present disclosure when viewed from above.

Next, with reference to FIG. 3, the configuration of the exposure unit 8 according to this embodiment is described. The exposure unit 8 includes a laser diode 81, lens units 82, 83, a polygon motor unit 7, fθ lenses 85, 86 and a reflecting mirror 87 in a housing 80.

The laser diode 81 is electrically connected to a circuit board 88 for controlling a laser beam emission timing and the like. The lens units 82, 83 are, for example, configured by collimator lenses, prisms or the like.

The polygon motor unit 7 includes a motor portion 71c and a polygon mirror 71b on a base plate. The polygon mirror 71b is in the form of a regular pentagonal flat plate when viewed from above, and deflects a laser beam from the lens unit 83 toward the fθ lens 85 while being rotated by the motor portion 71c.

The fθ lenses 85, 86 are so arranged at appropriate positions in the housing 80 that arched parts thereof face each other and have a function of scanning the laser beam deflected by the polygon mirror 71b on the photoconductive drum 17 at a constant speed. The reflecting mirror 87 is provided to reflect the laser beam from the fθ lens 86 and introduce it to the photoconductive drum 17. The polygon motor unit 7 is described in detail later.

In this exposure unit 8, a laser beam emitted from the laser diode 81 is introduced to the polygon mirror 71b via the lens units 82, 83. The laser beam incident on the rotating polygon mirror 71b is reflected and deflected by a mirror surface of the polygon mirror 71b and, then, passes through the fθ lenses 85, 86 to be reflected by the reflecting mirror 87. In this way, the laser beam is introduced to a drum surface of the photoconductive drum 17 (image bearing member) rotated (in a direction of an arrow B of FIG. 3) about an axial center perpendicular to a predetermined scanning direction (direction of an arrow A of FIG. 3) while being horizontally scanned in the scanning direction.

Figure 5:
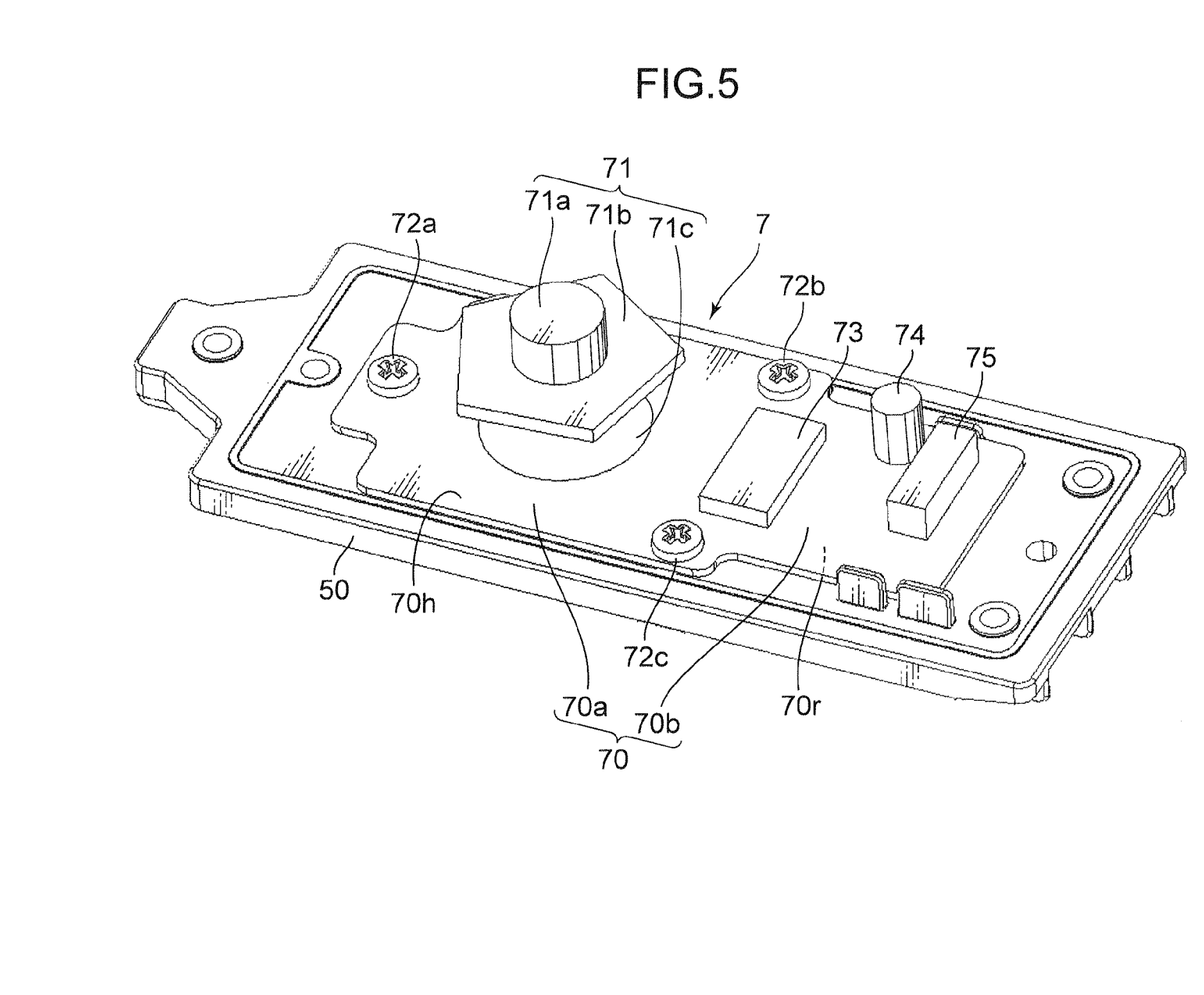
FIG. 5 is a perspective view of a polygon motor unit according to the embodiment of the present disclosure when viewed from above.

The polygon motor unit 7 includes a thermally conductive plate 50, a first thermally conductive sheet 60, a polygon motor board 70 and a polygon motor 71 (FIG. 5). The polygon motor unit includes two plate-like members, i.e. the thermally conductive plate 50 and the polygon motor board 70.

Figure 4:
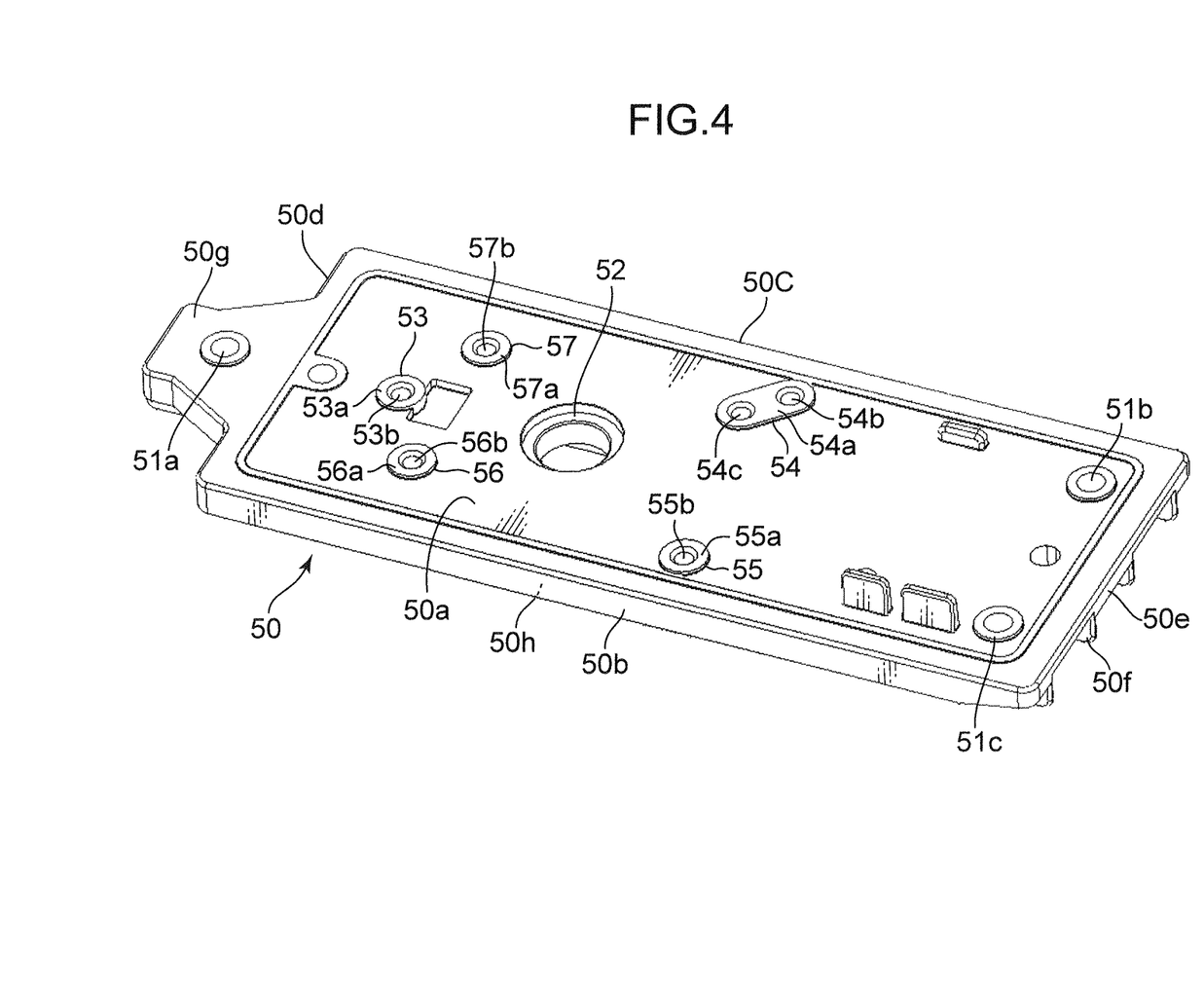
FIG. 4 is a perspective view of a thermally conductive plate according to the embodiment of the present disclosure when viewed from above.

With reference to FIG. 4, the thermally conductive plate (thermally conductive member) is equivalent to one plate-like member of the polygon motor unit 7 composed of the two plate-like members. The thermally conductive plate 50 is made of a metal material having high thermal conductivity. The thermally conductive plate 50 includes an upper surface portion 50a (third surface) forming one surface of a rectangular shape, a first side surface portion 50b and a second side surface portion 50c as a pair of side surfaces standing up from the upper surface portion 50a and located on longer sides of the rectangular shape, a front portion 50d and a rear portion 50e respectively connected to the pair of side surface portions and arranged to face each other on shorter sides of the rectangular shape. Further, a lower surface portion 50h (fourth surface) is arranged at a side (underside) opposite to the upper surface portion 50a.

Further, the thermally conductive plate 50 includes a protruding portion 50g having a substantially rectangular shape when viewed from above on the front portion 50d. Substantially in the center, the protruding portion 50g includes a cylindrical first fastening portion 51a (positioning portion) projecting in a vertical direction from the upper surface portion 50a and having a small height. On the other hand, a second fastening portion 51b (positioning portion) and a third fastening portion 51c (positioning portion) are arranged near two corners along the rear portion 50e on the upper surface portion 50a. The second and third fastening portions 51b, 51c are also in the form of cylinders projecting in the vertical direction from the upper surface portion 50a and having a small height. Each of these three fastening portions includes a screw hole inside the cylindrical shape. The thermally conductive plate 50 is fastened to the housing 80 (see FIG. 3) by screws at these three fastening portions. A reference position of the thermally conductive plate 50 with respect to the housing 80 is set at these three fastening portions. Further, the thermally conductive plate 50 includes an opening 52 (bearing hole). The opening 52 is a circular opening arranged at a position of the thermally conductive plate 50 somewhat displaced toward the front portion 50d from a central part of the upper surface portion 50a. A rotary shaft (shaft portion) of the polygon motor 71 to be described later is inserted into the opening 52.

The upper surface portion 50a further includes a first projection 53 (projection), a second projection 54 (projection), a third projection 55 (projection), a first auxiliary projection 56 and a second auxiliary projection 57.

The first projection 53 is arranged at a position displaced toward the front portion 50d from the opening 52. The first projection 53 is in the form of a cylinder projecting in the vertical direction from the upper surface portion 50a and having a small height. The first projection 53 includes a ring-shaped first reference surface 53a on the upper surface and a first fixing hole 53b (screw hole) formed inside the first reference surface 53a.

The second projection 54 is arranged at a position displaced toward the rear portion 50e from the opening 52 and near the second side surface portion 50c. The second projection 54 projects from the upper surface portion 50a in the vertical direction and has a small height and a substantially elliptical cross-section. The second projection 54 includes a second reference surface 54a on the upper surface and a second fixing hole 54b (screw hole) and a first auxiliary fixing hole 54c formed adjacent to each other inside the second reference surface 54a.

The third projection 55 is arranged at a position displaced toward the rear portion 50e from the opening 52 and near the first side surface portion 50b. Similar to the first projection 53, the third projection 55 is in the form of a cylinder projecting in the vertical direction from the upper surface portion 50a. The third projection 55 includes a ring-shaped third reference surface 55a on the upper surface and a third fixing hole 55b (screw hole) formed inside the third reference surface 55a.

Further, around the first projection 53, the first auxiliary projection 56 and the second auxiliary projection 57 shaped similarly to the first projection 53 are arranged at opposite sides of the first projection 53. The first auxiliary projection 56 includes a first auxiliary reference surface 56a and a second auxiliary fixing hole 56b, and the second auxiliary projection 57 includes a second auxiliary reference surface 57a and a third auxiliary fixing hole 57b. Note that, in this embodiment, the first and second auxiliary projections 56, 57 and the first auxiliary fixing hole 54c are not used. These may be used as substitutes when the first projection 53 and the like are broken. Further, these are used in place of the first projection 53 and the like such as when the shape of the polygon motor board 70 mounted on the thermally conductive plate 50 differs.

Furthermore, a lattice-shaped rib portion 50f (rib member for heat radiation) projects on the lower surface portion 50h. The rib portion 50f has a function of radiating heat accumulated in the thermally conductive plate 50 from the surface.

Next, the configuration of the polygon motor board 70 (board) according to this embodiment is described with reference to FIG. 5. The polygon motor board 70 is equivalent to the other plate-like member of the polygon motor unit 7 composed of the two plate-like members. The polygon motor board 70 is formed of a plate-like member somewhat smaller than the thermally conductive plate 50 and substantially rectangular when viewed from above. The polygon motor board 70 is so placed on and fixed to the thermally conductive plate 50 that longer and shorter sides of the rectangular shape of the polygon motor board 70 are respectively located substantially in the centers of the longer and shorter sides of the rectangular shape of the thermally conductive plate 50. The polygon motor board 70 includes an installation surface 70h (first surface) and a facing surface 70g (second surface) opposite to the installation surface 70h and facing the thermally conductive plate 50.

The polygon motor 71, a driver IC 73, a capacitor 74 and a connector 75 are mounted on the installation surface 70h (first surface) of the polygon motor board 70. Further, the polygon motor board 70 is divided into a substantially rectangular first board portion 70a on which the polygon motor 71 is mounted and a second board portion 70b on which the driver IC 73, the capacitor 74 and the connector 75 are mounted and which is connected to the first board portion 70. Various resin board materials are used for the polygon motor board 70.

The polygon motor 71 is arranged substantially in a central part of the first board portion 70a and includes the polygon mirror 71b with a multifaceted reflecting surface on its periphery, a head portion 71a for supporting the polygon mirror 71b, and the motor portion 71c with an unillustrated rotary shaft (shaft portion) for rotating the polygon mirror 71b. The rotary shaft penetrates from the installation surface 70h of the first board portion 70a, on which the polygon mirror 71b is mounted, to the facing surface 70r at the opposite side and projects toward the thermally conductive plate 50. The projecting rotary shaft is inserted into the opening 52 of the thermally conductive plate 50. When a drive current is input to the motor portion 71c, the polygon mirror 71b is rotated about the rotary shaft and performs a predetermined light deflecting operation.

The driver IC 73 is arranged on a boundary part of the second board portion 70b with the first board portion 70a. The drive IC 73 supplies a drive current to the motor portion 71c. The capacitor 74 rectifies a control current and the like input to the drive IC 73. The connector 75 is electrically connected to an apparatus main body of the image forming apparatus 1 and allows a control signal input from the apparatus main body to be received into the polygon motor board 70. The capacitor 74 and the connector 75 are respectively arranged adjacent to each other at a side of the second board portion 70b closer to the leading end than the driver IC 73.

As described above, the polygon mirror 71b deflects a laser beam toward the fθ lens 85 (FIG. 3) while being rotated by the motor portion 71c. The laser beam having passed through the fθ lens 85 is scanned on the photoconductive drum 17. Thus, the position of the multifaceted reflecting surface of the polygon mirror 71b affects the accuracy of an electrostatic latent image on the photoconductive drum 17. Therefore, the position accuracy of the polygon motor board 70 on which the polygon mirror 71b is mounted also needs to be set within a predetermined range.

In this embodiment, the first, second and third projections 53, 54 and 55 projecting from the upper surface portion 50a support and position the polygon motor board 70 on the thermally conductive plate 50 (FIG. 4). Specifically, the first, second and third reference surfaces 53a, 54a and 55a of the first, second and third projections 53, 54 and 55 come into contact with the surface of the first board portion 70a opposite to the one on which the polygon mirror 71b is mounted. A height to of any of the first, second and third reference surfaces 53a, 54a and 55a projecting from the upper surface portion 50a is managed with high accuracy and the flatness thereof is also set within a predetermined range to position the polygon motor board 70. In this embodiment, after the thermally conductive plate 50 is formed by die casting (die casting method), the first, second and third reference surfaces 53a, 54a and 55a are finally formed by cutting and grinding.

The polygon motor board 70 includes unillustrated screw holes respectively formed in conformity with the first, second and third fixing holes 53b, 54b and 55b of the thermally conductive plate 50. A first screw 72a, a second screw 72b and a third screw 72c (see FIG. 5) inserted into these screw holes are respectively fastened to the first, second and third fixing holes 53b, 54b and 55b (see FIG. 4) of the thermally conductive plate 50, whereby the polygon motor board 70 is fixedly supported on the thermally conductive plate 50. At this time, the fastening positions of the first, second and third screws 72a, 72b and 72c are set to surround the polygon motor 71 on the first board portion 70a. Specifically, the first screw 72a fastens an end part of the first board portion 70a located on the front portion 50d of the thermally conductive plate 50. On the other hand, the second and third screws 72b, 72c fasten near a boundary of the first board portion 70a with the second board portion 70b at a side of the polygon motor 71 opposite to the first screw 72a. Note that since the driver IC 73, the capacitor 74 and the connector 75 arranged on the second board portion 70b need not be positioned with high accuracy, the fixed positions of the polygon motor board 70 are arranged not on the second board portion 70b, but on the first board portion 70a.

As just described, in this embodiment, the polygon motor board 70 is supported and the position thereof is determined by the first, second and third projections 53, 54 and 55 projecting from the thermally conductive plate 50. At this time, since a contact area can be made smaller as compared with the case where the polygon motor board 70 is supported on the entire surface of the upper surface portion 50a, a surface processing area for positioning is made smaller and processing cost is reduced.

Figure 6:
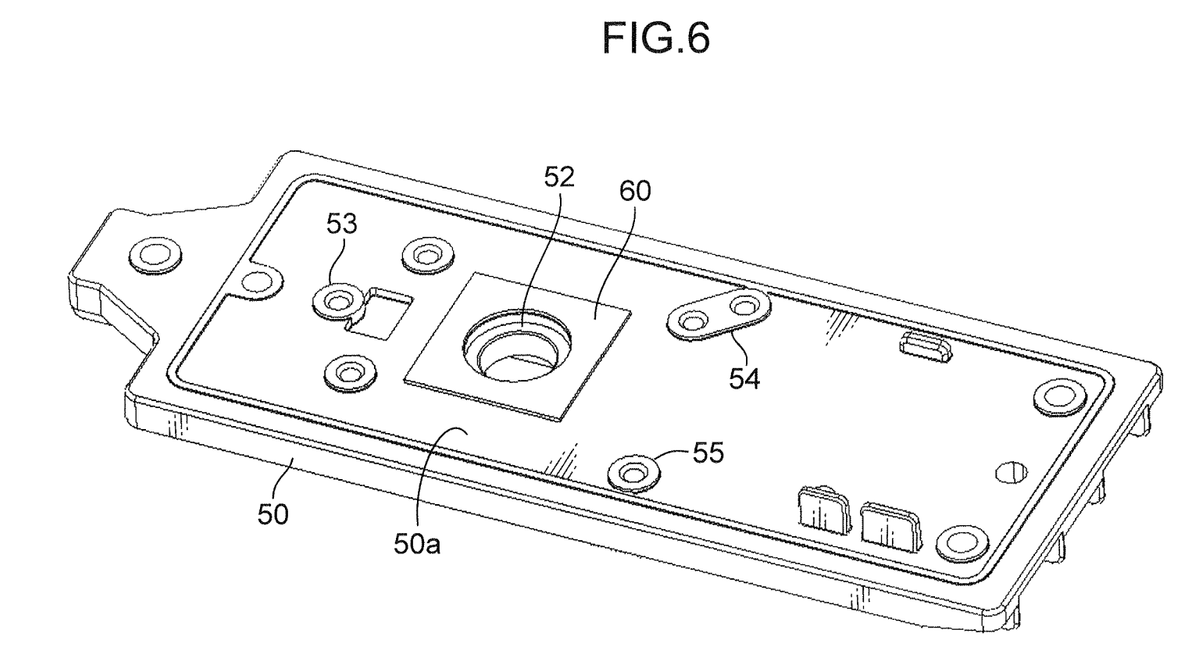
FIG. 6 is a perspective view of the thermally conductive plate according to the embodiment of the present disclosure when viewed from above.

Further, in this embodiment, a first thermally conductive sheet 60 (elastic member) rectangular when viewed from above is arranged around the opening 52 on the upper surface portion 50a of the thermally conductive plate 50 as shown in FIG. 6. The first thermally conductive sheet 60 has a function of quickly transferring heat generated as the polygon motor 71 rotates to the thermally conductive plate 50. The first thermally conductive sheet 60 is an elastic sheet including a round hole corresponding to the opening 52 in a central part. The first thermally conductive sheet 60 is arranged between the thermally conductive plate 50 and the polygon motor board 70 to surround the opening 52 into which the rotary shaft of the polygon motor 71 is to be inserted. Various thermally conductive materials are used for the first thermally conductive sheet 60. For example, acrylic resins containing a highly thermally conductive material and the like are used. Particularly, Sarcon (Japanese registered trademark) produced by Fuji Polymer Industries, co., ltd. is preferably used.

In a state where the first thermally conductive sheet 60 is placed on the upper surface portion 50a, a thickness tb of the first thermally conductive sheet 60 in a direction perpendicular to the upper surface portion 50a is set to be larger than the projecting height ta of the first, second and third reference surfaces 53a, 54a and 55a (ta<tb). When the polygon motor board is placed on the first thermally conductive sheet 60 and the polygon motor board 70 and the thermally conductive plate 50 are fixed by the first, second and third screws 72a, 72b and 72c, the first thermally conductive sheet 60 sandwiched therebetween is compressed from the thickness tb to the thickness ta.

At this time, since the first thermally conductive sheet 60 is made of an elastic material, it comes into contact with the upper surface portion 50a and the underside of the polygon motor board 70 with an expansive restoring force. The restoring force increases a contact area of the first thermally conductive sheet 60 and the upper surface portion 50a or the polygon motor board 70 in a very small region. Thus, heat transfer from the polygon motor board 70 to the thermally conductive plate 50 is promoted as compared with the case where the projecting height ta of the first to third reference surfaces and the thickness tb of the first thermally conductive sheet 60 are equal (ta=tb).

Further, the first thermally conductive sheet 60 is arranged to surround the opening 52 into which the rotary shaft of the polygon motor 71 is to be inserted. Thus, the first thermally conductive sheet 60 acts to trap radiation heat generated from the rotary shaft to the surrounding inside. Therefore, the radiation heat is transferred to the thermally conductive plate 50 without being diffused to the surrounding.

Note that, in this embodiment, the thickness tb of the first thermally conductive sheet 60 is set to be smaller than twice the projecting height ta of the first to third reference surfaces 53a, 54a and 55a (tb<2×ta). In FIG. 6, if the thickness tb of the first thermally conductive sheet 60 placed on the thermally conductive plate 50 is larger than twice the projecting height ta of the first to third reference surfaces 53a, 54a and 55a, the posture of the polygon motor board 70 placed on the thermally conductive plate 50 becomes unstable. Further, in this case, the polygon motor board 70 may be fixed in an inclined state when the polygon motor board 70 is fastened to the thermally conductive plate 50 by the first, second and third screws 72a, 72b and 72c. Thus, a stable assembling operation is realized by setting the thickness tb of the first thermally conductive sheet smaller than twice the projecting height ta of the first to third reference surfaces.

Further, the heat transferred to the thermally conductive plate 50 is effectively radiated from the surface of the lattice-like rib portion 50f arranged on the underside of the upper surface portion 50a. Accordingly, it is suppressed that the heat is accumulated in the thermally conductive plate 50 and the temperature of the thermally conductive plate 50 becomes higher than that of the polygon motor board 70. Thus, heat transfer from the polygon motor board 70 to the thermally conductive plate 50 can be sustained.

Figure 7:
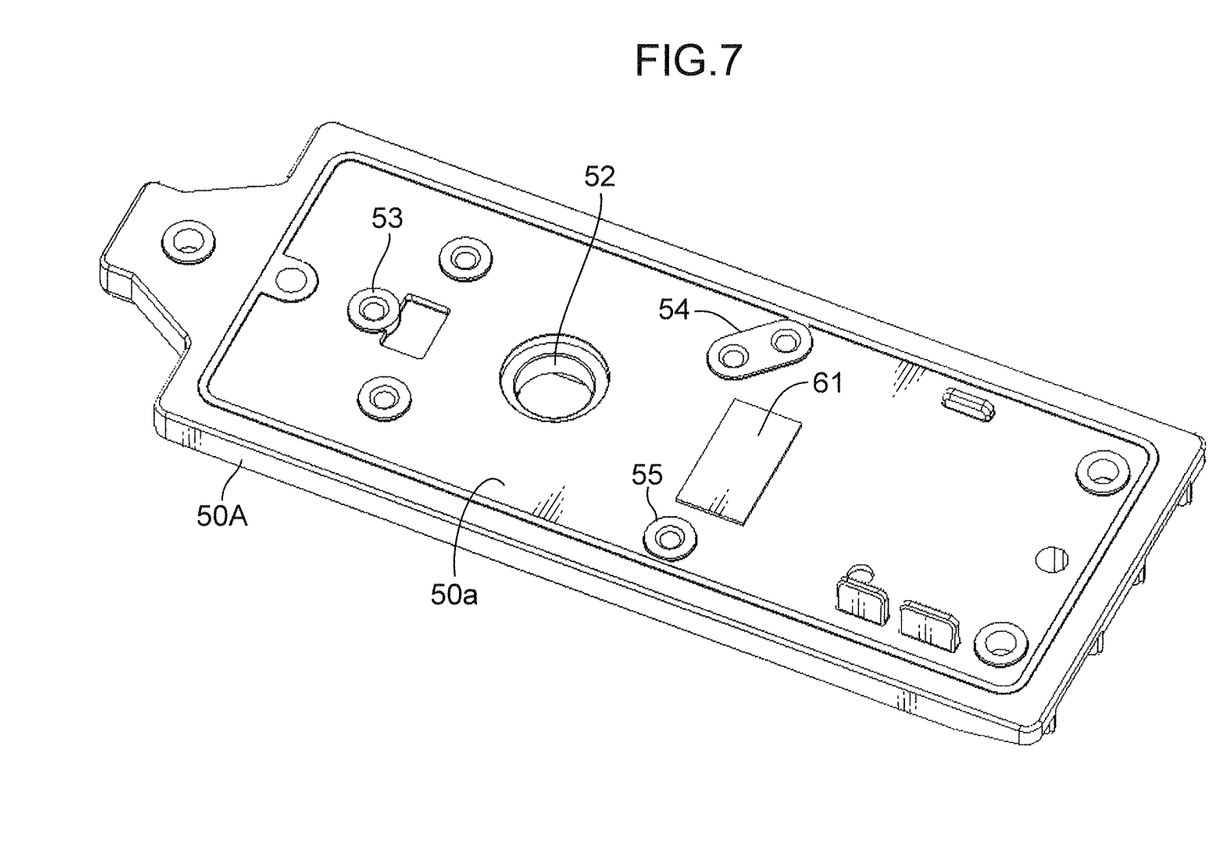
FIG. 7 is a perspective view of a thermally conductive plate according to another embodiment of the present disclosure when viewed from above.

Next, a second embodiment of the polygon motor unit 7 is described with reference to FIGS. 5 and 7. FIG. 7 is a perspective view of a thermally conductive plate 50A forming the polygon motor unit 7 according to this embodiment when viewed from above. The second embodiment differs from the first embodiment in that a second thermally conductive sheet 61 is arranged, instead of the first thermally conductive sheet 60, on an upper surface portion 50a. Thus, this second thermally conductive sheet 61 is described and other points are not described.

The second thermally conductive sheet 61 is placed on the upper surface portion 50a immediate below a position of a polygon motor board 70 where a driver IC 73 is arranged (see FIG. 5). When the thermally conductive plate 50A and the polygon motor board 70 are fixed to each other as in the first embodiment, the second thermally conductive sheet 61 is arranged below the driver IC 73. Thus, even if the temperature of the driver IC 73 increases in supplying a drive current to a polygon motor 71, heat accumulated in the driver IC 73 is transferred from a second board portion 70b to the thermally conductive plate 50A via the second thermally conductive sheet 61. Thus, a temperature increase of the driver IC 73 is suppressed and an operation failure of the driver IC 73 caused by the temperature increase is effectively suppressed.

As in the first embodiment, fastened positions of the polygon motor board 70 are arranged on a first board portion 70a (first, second and third projections 53, 54 and 55). Thus, if the temperature of the second board portion 70b increases due to a temperature increase of the driver IC 73, the second board portion 70 may be possibly warped with respect to the first board portion 70a. Even in such a case, since heat generated from the driver IC is transferred to the thermally conductive plate 50A via the second thermally conductive sheet 61 as described above in this embodiment, the deformation of the polygon motor board 70 is effectively suppressed.

In the polygon motor unit 7 according to the above embodiments, the polygon motor board 70 is positioned by the first, second and third projections 53, 54 and 55 projecting from the upper surface portion 50a of the thermally conductive plate 50 or 50A. Thus, a contact area can be made smaller as compared with the case where the polygon motor board 70 is supported on the entire surface of the upper surface portion 50a, wherefore the surface processing area for positioning is made smaller and the processing cost is reduced.

On the other hand, a heat transfer path from the polygon motor board 70 to the thermally conductive plate 50 or 50A is reduced by making the contact area for positioning smaller. Even in such a case, in the above embodiments, the first and second thermally conductive sheets 60 and 61 have a function of effectively relaying heat transfer between the polygon motor board 70 and the thermally conductive plate 50 or 50A by being held in close contact with the polygon motor board 70 and the thermally conductive plate 50 or 50A with an expansive restoring force.

Thus, a laser beam can be accurately deflected by the polygon mirror 71b without the temperature of the polygon mirror 71b mounted on the polygon motor board 70 increasing. As a result, the accuracy of an electrostatic latent image on the photoconductive drum 17 is stably maintained.

Further, according to the above first embodiment, the first thermally conductive sheet 60 is arranged between the facing surface 70r and the upper surface portion 50a near the position on the polygon motor board 70 where the rotary shaft of the polygon motor 71c is arranged. Thus, heat generated by the rotation of the polygon motor 71c can be transferred from a part closer to a heat source to the thermally conductive plate 50.

Further, the according to the above first embodiment, the first thermally conductive sheet 60 is arranged between the facing surface 70r and the upper surface portion 50a to surround the rotary shaft of the polygon motor 71c projecting from the facing surface 70r to the upper surface portion 50a.

Thus, the thermally conductive sheet 60 has a function of trapping radiation heat from the rotary shaft inside. Thus, this heat can be transferred to the thermally conductive plate 50 without being diffused to the surrounding.

Further, according to the above second embodiment, the second thermally conductive sheet 61 is arranged between the facing surface 70r and the upper surface portion 50a near the position of the driver IC 73 that tends to generate heat by outputting a drive current to the polygon motor 71c. Thus, the heat generated from the driver IC 73 tends to be transferred to the thermally conductive plate 50A and a temperature increase of the driver IC 73 is suppressed.

Further, according to the above embodiments, heat transferred to the thermally conductive plate 50 or 50A through the first or second thermally conductive sheet 60 or 61 is radiated through the rib portion 50f. This suppresses a reduction in heat transfer efficiency from the polygon motor board 70 due to a temperature increase of the thermally conductive plate 50 or 50A.

Further, according to the above embodiments, the relationship of $ta<tb$ is satisfied if $ta$ denotes the projecting height of the first, second and third projections 53, 54 and 55 from the upper surface portion 50a and $tb$ denotes the thickness of the first or second thermally conductive sheet 60 or 61 in the direction perpendicular to the upper surface portion 50a before the first or second thermally conductive sheet 60 or 61 is arranged between the facing surface 70r and the upper surface portion 50a. As a result, the first or second thermally conductive sheet 60 or 61 is reliably compressed between the facing surface 70r and the upper surface portion 50a, wherefore the contact area in the very small region is increased and heat is efficiently transferred from the polygon motor board 70 to the thermally conductive plate 50 or 50A.

Further, according to the above embodiments, the polygon motor board 70 and the thermally conductive plate 50 or 50A are fixed by the first, second and third screws 72a, 72b and 72c. Thus, the polygon motor board 70 is reliably positioned, the first or second thermally conductive sheet 60 or 61 is preferably compressed and heat transfer from the polygon motor board 70 to the thermally conductive plate 50 or 50A is effectively realized.

Further, according to the above embodiments, the relationship of $tb<2\times ta$ is satisfied. According to this configuration, since the polygon motor board 70 is not inclined due to the height tb of the first or second thermally conductive sheet 60 or 61 in fastening the polygon motor board 70 and the thermally conductive plate 50 or 50A by the first, second and third screws 72a, 72b and 72c, the fastening operation is easily performed.

Although the polygon motor unit 7 and the exposure unit 8 with the polygon motor unit 7 according to the embodiments of the present disclosure have been described above with respect to the image forming apparatus 1, the present disclosure is not limited to this and can be, for example, modified as follows.

(1) In the above embodiments, the first and second thermally conductive sheets 60, 61 are each arranged between the thermally conductive plate 50 or 50A and the polygon motor board near the position on the polygon motor board 70 where the polygon motor 71 and the driver IC 73 are arranged. However, the arrangement of the thermally conductive sheet is not limited to this. For example, the thermally conductive sheet may be arranged over the entire surface between the thermally conductive plate 50 or 50A and the polygon motor board 70 while avoiding the first, second and third projections 53, 54 and 55. Even in this case, the processing areas for positioning are consolidated to the first, second and third projections 53, 54 and 55 while the contact area for heat transfer is ensured.

(2) Although the thermally conductive plate 50 or 50A and the polygon motor board 70 are shown as two boards constituting the polygon motor unit 7 in the above embodiments, there is no limitation to this. For example, the thermally conductive plate 50 or 50A may be a bottom portion of the housing 80 of the exposure unit 8. Even in this case, the polygon motor board 70 is supported by the first, second and third projections 53, 54 and 55 projecting from the bottom portion of the housing 80. Further, the thermally conductive sheet arranged between the polygon motor board 70 and the bottom portion of the housing 80 effectively transfers heat generated by the polygon motor 71 to the housing 80.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A polygon motor unit to be mounted in a predetermined housing, the housing having a plurality of lenses arranged therein comprising:
    a polygon mirror which is driven and rotated and deflects light irradiated to the circumferential surface thereof to scan a predetermined target;
    a polygon motor which includes a shaft portion and rotates the polygon mirror;
    a plate-shaped board which includes a first surface and a second surface opposite to the first surface, the polygon mirror and the polygon motor being mounted on the first surface;
    a plate-shaped thermally conductive member which includes a positioning portion for setting a reference position with respect to the housing, a third surface facing the second surface and a projection projecting from the third surface toward the second surface and configured to position the board with respect to the reference position by coming into contact with the second surface; and
    an elastic member which is made of a thermally conductive material and arranged between the second surface and the third surface and comes into contact with the second surface and the third surface with a restoring force, wherein
    the elastic member is arranged between the second surface and the third surface near a position on the board where the shaft portion is arranged;
    the shaft portion penetrates the board from the first surface to the second surface and projects toward the third surface;
    the thermally conductive member includes a bearing hole formed in the third surface to face the shaft portion; and
    the elastic member is arranged between the second surface and the third surface to surround the bearing hole.

2. A polygon motor unit according to claim 1, wherein:
    the board includes a driver element for outputting a drive current to the polygon motor on the first surface; and
    the elastic member is arranged partially between the second surface and the third surface and immediately below the driver element.

3. A polygon motor units according to claim 2, wherein:
    the board includes a first board portion on which the polygon motor is mounted and a second board portion on which the driver element is mounted, the first board portion and the second board portion being connected to one another;
    the projection includes a screw hole facing the second surface;
    the board includes a plurality of through holes respectively facing the screw holes and penetrating from the first surface to the second surface;
    the board and the thermally conductive member are fixed integrally by a plurality of screws inserted respectively into the through holes and fastened respectively to the screw holes; and
    the screw holes are arranged on the first board portion and not on the second board portion and are set to surround the polygon motor.

4. A polygon motor unit according to claim 1, wherein:
    the thermally conductive member is a heat sink including a fourth surface opposite to the third surface and a rib member for heat radiation on the fourth surface.

5. A polygon motor unit according to claim 1, wherein:
    if ta denotes a projecting height of the projection from the third surface and tb denotes a thickness of the elastic member in a direction perpendicular to the third surface before the elastic member is arranged between the second surface and the third surface, a relationship of ta<tb is satisfied.

6. A polygon motor unit according to claim 5, wherein:
    the projection includes a screw hole facing the second surface;
    the board includes a plurality of through holes facing the screw hole and penetrating from the first surface to the second surface; and
    the board and the thermally conductive member are integrally fixed by a plurality of screws inserted respectively into the through holes and fastened to the respective screw holes.

7. A polygon motor unit according to claim 6, wherein:
a relationship of tb<2×ta is satisfied.

8. An optical scanning device, comprising:
a housing having a plurality of lenses arranged therein;
a polygon motor unit which is mounted in the housing and includes a polygon mirror; and
a light source which irradiates light to the polygon mirror;
wherein the polygon motor unit includes:
    the polygon mirror which is driven and rotated and deflects light irradiated to the circumferential surface thereof to scan a predetermined target;
    a polygon motor which includes a shaft portion and rotates the polygon mirror;
    a plate-shaped board which includes a first surface and a second surface opposite to the first surface, the polygon mirror and the polygon motor being mounted on the first surface;
    a plate-shaped thermally conductive member which includes a positioning portion for setting a reference position with respect to the housing, a third surface facing the second surface and a projection projecting from the third surface toward the second surface and configured to position the board with respect to the reference position by coming into contact with the second surface; and
    an elastic member which is made of a thermally conductive material and arranged between the second surface and the third surface and comes into contact with the second surface and the third surface with a restoring force,
wherein the elastic member is arranged between the second surface and the third surface near a position on the board where the shaft portion is arranged;

the shaft portion penetrates the board from the first surface to the second surface and projects toward the third surface;

the thermally conductive member includes a bearing hole formed in the third surface to face the shaft portion; and the elastic member is arranged between the second surface and the third surface to surround the bearing hole.

9. An optical scanning device according to claim 8, wherein:

the board includes a driver element for outputting a drive current to the polygon motor on the first surface; and the elastic member is arranged partially between the second surface and the third surface and immediately below the driver element.

10. an optical scanning device according to claim 9, wherein:

the board includes a first board portion on which the polygon motor is mounted and a second board portion on which the driver element is mounted, the first board portion and the second board portion being connected to one another;

the projection includes a screw hole facing the second surface;

the board includes a plurality of through holes respectively facing the screw holes and penetrating from the first surface to the second surface;

the board and the thermally conductive member are fixed integrally by a plurality of screws inserted respectively into the through holes and fastened respectively to the screw holes; and the screw holes are arranged on the first board portion and not on the second board portion and are set to surround the polygon motor.

11. An optical scanning device according to claim 8, wherein:

the thermally conductive member is a heat sink including a fourth surface opposite to the third surface and a rib member for heat radiation on the fourth surface.

12. An optical scanning device according to claim 8, wherein:

if ta denotes a projecting height of the projection from the third surface and tb denotes a thickness of the elastic member in a direction perpendicular to the third surface before the elastic member is arranged between the second surface and the third surface, a relationship of ta<tb is satisfied.

13. An optical scanning device, comprising:

a housing having a plurality of lenses arranged therein;

a polygon motor unit which is mounted in the housing and includes a polygon mirror;

a light source which irradiates light to the polygon mirror; and an image bearing member which is scanned by the polygon mirror to form an electrostatic latent image on a surface;

wherein the polygon motor unit includes:

the polygon mirror which is driven and rotated and deflects light irradiated to the circumferential surface thereof to scan a predetermined target;

a polygon motor which includes a shaft portion and rotates the polygon mirror;

a plate-shaped board which includes a first surface and a second surface opposite to the first surface, the polygon mirror and the polygon motor being mounted on the first surface;

a plate-shaped thermally conductive member which includes a positioning portion for setting a reference position with respect to the housing, a third surface facing the second surface and a projection projecting from the third surface toward the second surface and configured to position the board with respect to the reference position by coming into contact with the second surface; and an elastic member which is made of a thermally conductive material and arranged between the second surface and the third surface and comes into contact with the second surface and the third surface with a restoring force, wherein the elastic member is arranged between the second surface and the third surface near a position on the board where the shaft portion is arranged;

the shaft portion penetrates the board from the first surface to the second surface and projects toward the third surface;

the thermally conductive member includes a bearing hole formed in the third surface to face the shaft portion; and the elastic member is arranged between the second surface and the third surface to surround the bearing hole.

14. An image forming apparatus according to claim 13, wherein:

the board includes a driver element for outputting a drive current to the polygon motor on the first surface; and the elastic member is arranged partially between the second surface and the third surface and immediately below the driver element is arranged.

15. an image forming apparatus according to claim 14, wherein:

the board includes a first board portion on which the polygon motor is mounted and a second board portion on which the driver element is mounted, the first board portion and the second board portion being connected to one another;

the projection includes a screw hole facing the second surface;

the board includes a plurality of through holes respectively facing the screw holes and penetrating from the first surface to the second surface;

the board and the thermally conductive member are fixed integrally by a plurality of screws inserted respectively into the through holes and fastened respectively to the screw holes; and the screw holes are arranged on the first board portion and not on the second board portion and are set to surround the polygon motor.

16. An image forming apparatus according to claim 13, wherein:

the thermally conductive member is a heat sink including a fourth surface opposite to the third surface and a rib member for heat radiation on the fourth surface.

17. An image forming apparatus according to claim 13, wherein:

if ta denotes a projecting height of the projection from the third surface and tb denotes a thickness of the elastic member in a direction perpendicular to the third surface before the elastic member is arranged between the second surface and the third surface, a relationship of ta<tb is satisfied.

* * * * *